(12) United States Patent
Haque et al.

(10) Patent No.: US 7,952,961 B2
(45) Date of Patent: May 31, 2011

(54) AUDIO COMPASS FOR MOTION TRACKING

(75) Inventors: Jamal Haque, Clearwater, FL (US); Andrew W. Guyette, Clearwater, FL (US); Edward R. Prado, Palm Harbor, FL (US); Keith A. Souders, Tampa, FL (US)

(73) Assignee: Honeywell International Inc., Morristown, NJ (US)

( * ) Notice: Subject to any disclaimer, the term of this patent is extended or adjusted under 35 U.S.C. 154(b) by 517 days.

(21) Appl. No.: 11/872,450

(22) Filed: Oct. 15, 2007

(65) Prior Publication Data

US 2009/0097359 A1 Apr. 16, 2009

(51) Int. Cl.
*G01S 3/80* (2006.01)
(52) U.S. Cl. ......... 367/118; 367/124; 367/129; 340/621
(58) Field of Classification Search ........... 367/141–190
See application file for complete search history.

(56) References Cited

U.S. PATENT DOCUMENTS

| | | | | |
|---|---|---|---|---|
| 3,106,982 | A | | 10/1963 | Wade |
| 3,273,112 | A | | 9/1966 | Hobson |
| 3,296,587 | A | * | 1/1967 | Baker ........................ 367/136 |
| 3,302,745 | A | | 2/1967 | Ikrath |
| 3,638,178 | A | * | 1/1972 | Stephenson .................. 367/71 |
| 3,940,733 | A | | 2/1976 | Johnson et al. |
| 3,985,977 | A | | 10/1976 | Beaty et al. |
| 4,091,366 | A | * | 5/1978 | Lavallee ...................... 340/524 |
| 5,515,509 | A | | 5/1996 | Rom |
| 5,798,458 | A | | 8/1998 | Monroe |
| 5,850,592 | A | | 12/1998 | Ramanathan |
| 5,861,846 | A | * | 1/1999 | Minter ......................... 342/443 |
| 6,859,831 | B1 | | 2/2005 | Gelvin et al. |
| 6,928,030 | B2 | | 8/2005 | Chamberlain et al. |
| 7,013,745 | B2 | | 3/2006 | Kolarczyk et al. |
| 7,035,240 | B1 | | 4/2006 | Balakrishnan et al. |
| 7,304,976 | B2 | | 12/2007 | Mao et al. |
| 7,307,915 | B2 | | 12/2007 | Kimball |
| 2005/0047277 | A1 | * | 3/2005 | Chamberlain et al. ........ 367/136 |
| 2007/0223306 | A1 | * | 9/2007 | Toennessen .................. 367/15 |
| 2007/0223307 | A1 | * | 9/2007 | Storteig et al. ................ 367/16 |
| 2008/0137476 | A1 | | 6/2008 | Eick et al. |

OTHER PUBLICATIONS

Briscoe, H. W. "Study of the Feasibility of Long-Range Seismic Communications." 1972. Bolt Beranek and Newman, Inc., Cambridge, MA.
Lacombe et al., "Seismic Detection Algorithm and Sensor Deployment Recommendations for Perimeter Security", "Proceedings of SPIE, vol. 6231, Unattended Ground, Sea, and Air Sensor Technologies and Applications VIII, 623109", May 2, 2006, pp. 1-10, vol. 6231.

* cited by examiner

*Primary Examiner* — Thomas H Tarcza
*Assistant Examiner* — Luke D Ratcliffe
(74) *Attorney, Agent, or Firm* — Shumaker & Sieffert, P.A.

(57) ABSTRACT

A method for tracking motion using an audio compass is disclosed. The method comprises receiving motion sensor data indicating seismic activity recorded by at least two seismic sensors, and converting the received motion sensor data into audio signals for interpretation at an audio compass. The method uses the audio compass to determine a current distance to the seismic activity based on an interpreted signal intensity of the audio signals. The method further uses the audio compass to identify a current position of the audio compass relative to the seismic activity.

20 Claims, 4 Drawing Sheets

AUDIO COMPASS FOR MOTION TRACKING

RELATED APPLICATION

This application is related to commonly assigned U.S. patent application Ser. No. 11/868,272, filed on Oct. 5, 2007 and entitled "ACOUSTIC COMMUNICATION AND CONTROL FOR SEISMIC SENSORS" (the '272 application). The '272 Application is incorporated herein by reference.

BACKGROUND

Various audio devices are able to discriminate small differences in loudness (intensity) and pitch (frequency) over a large range of audible sound (for example, between 20 Hz and 20 kHz). These various audio devices can also be used to aquire information about a surrounding environment. The capability to reliably track or detect motion based on these audible sounds, similar to a trained "tracker" as depicted on film and television, is a reality with the current advancements in motion sensor technology. For example, security perimeter sensors can be employed in various locations within a defined area. These perimeter sensors can send and receive radar, video, audio, or seismic signals, and are applicable in many security situations.

Presently, in order to take advantage of particular audio and video signals from these perimeter sensors, specialized monitoring equipment is required. Moreover, this equipment is typically stationed at a remote site some distance away from the area under surveillance. The ability to monitor objects or activity directly within the perimeter is limited, and can result in undesired consequences if one or more sources of the activity are not discovered.

SUMMARY

A method for tracking motion using an audio compass is provided. The method comprises receiving motion sensor data indicating seismic activity recorded by at least two seismic sensors, and converting the received motion sensor data into audio signals for interpretation at an audio compass. The method uses the audio compass to determine a current distance to the seismic activity based on an interpreted signal intensity of the audio signals. The method further uses the audio compass to identify a current position of the audio compass relative to the seismic activity.

DRAWINGS

These and other features, aspects, and advantages are better understood with regard to the following description, appended claims, and accompanying drawings where:

The various described features are drawn to emphasize features relevant to the embodiments disclosed. Like reference characters denote like elements throughout the figures and text of the specification.

DETAILED DESCRIPTION

Embodiments disclosed herein relate to an audio compass for motion tracking that allows a user to maintain situational awareness of one or more sources of motion monitored by a network of sensors such as a network of seismic sensors, for example. In at least one embodiment, a low cost, early warning perimeter security device comprises a personal audio headset which, when combined with an audio amplifier and a gyroscope, provides the user with at least one of a direction, a distance and an orientation with respect to various types of security threats. For example, the user with two ears is capable of detecting at least one seismic energy source by (1) difference in sound intensity between the two ears; (2) difference in time-of-arrival between the two ears; and (3) difference in time-of-arrival between reflections from each of the ears using the audio compass disclosed herein.

The audio compass is operable for many security applications. For example, military personnel operating in an unfriendly area would utilize the audio compass for perimeter security in a hands free environment without the burden of having a computer screen to provide critical alarm intrusion information. Moreover, a motion tracking system employing the use of the audio compass provides an early indication of possible intrusion for the user guarding a high-value asset. As discussed in further detail below, based on the processing of audio frequency signals in the audio compass, the user will be able to discern an approaching seismic energy source well beyond the user's range of vision and hearing.

Figure 1:
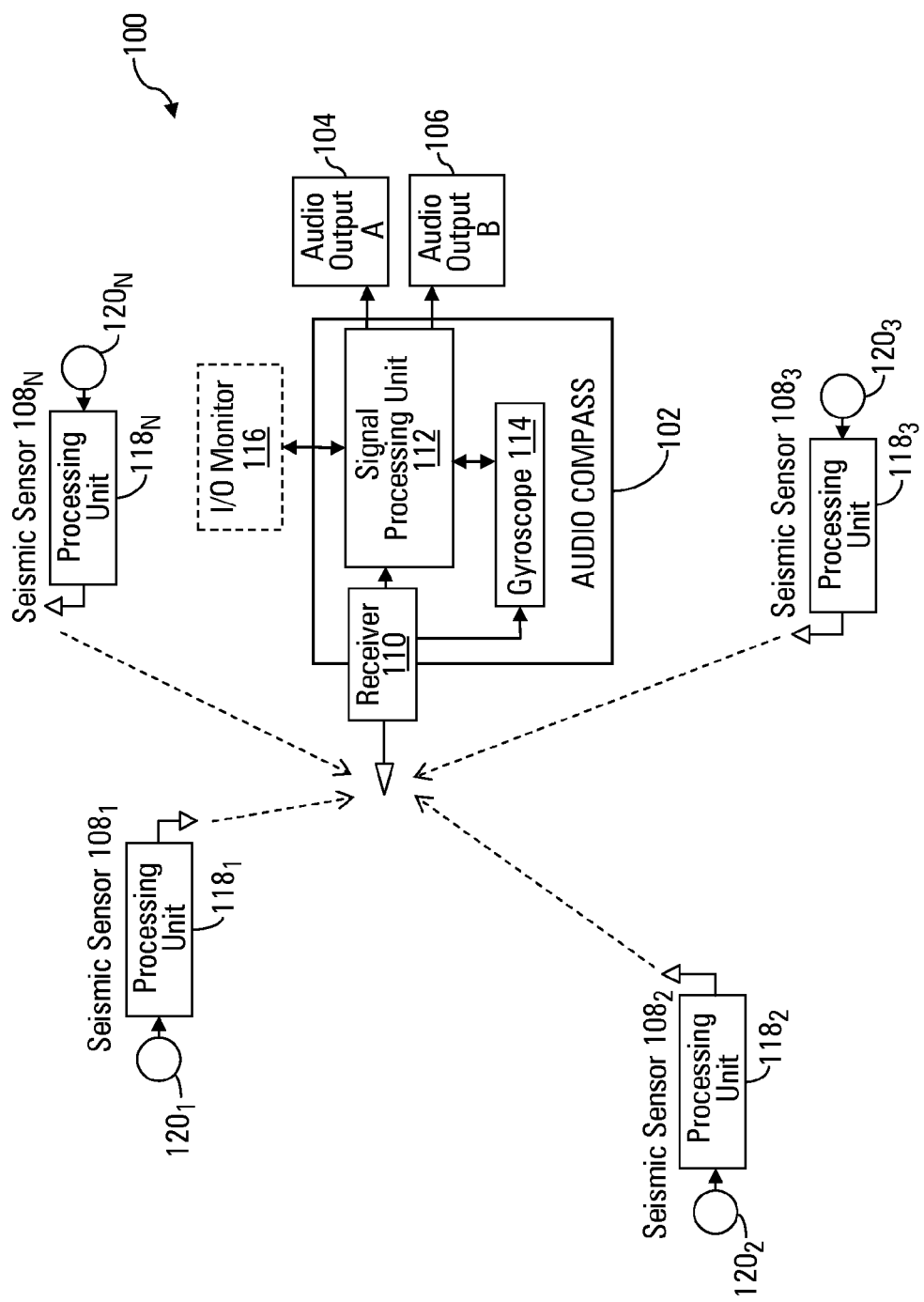
FIG. 1 is a block diagram of an embodiment of a motion tracking system.

FIG. 1 is a block diagram of an embodiment of a motion tracking system 100. The system 100 comprises an audio compass 102 and seismic sensors $108_1$ to $108_N$ in communication with the audio compass 102. It is understood that the system 100 is capable of accommodating any appropriate number of the seismic sensors $108_1$ to $108_N$ (for example, at least two or more seismic sensors 108) for motion tracking in a single system 100. In the example embodiment of FIG. 1, each of the seismic sensors 108 comprise processing units $118_1$ to $118_N$ and seismic sensing nodes $120_1$ to $120_N$. In one implementation, the seismic sensing nodes 120 comprise piezoelectric sensing elements. It is understood that alternate sensing elements for the seismic sensing nodes 120 can be implemented in the seismic sensors 108 of FIG. 1. In one implementation, the processing units 118 comprise at least one of an analog-to-digital (A/D) converter, a digital signal processor (DSP), or a radio-frequency (RF) transmitter for transmitting the seismic energy waves to the audio compass 102. It is also understood that the seismic sensors 108 can provide the seismic readings to the audio compass 102 over various mediums including, without limitation, wired, wireless, or optical communications. For example, the seismic sensors 108 can be similar in design to the acoustic devices described in the '272 Application.

The audio compass 102 further comprises an audio receiver 110, a signal processing unit 112 responsive to the audio receiver 110, and at least two audio outputs 104 ("A") and 106 ("B") communicatively coupled to the signal processing unit 112. In the example embodiment of FIG. 1, the audio compass 102 comprises a stereo audio headset. In one implementation, the system 100 further comprises a gyroscope 114 responsive to the signals processed by the signal processing unit 112. In the example embodiment of FIG. 1, the signal processing unit 112 comprises at least one of a microprocessor, a microcontroller, a field-programmable gate array (FPGA), a field-programmable object array (FPOA), a programmable logic device (PLD), or an application-specific integrated circuit (ASIC). Moreover, the gyroscope 114 comprises a gyroscope fabricated as a micro electromechanical systems (MEMS) device with at least one axis of rotation.

In at least one additional implementation, the system 100 further includes an optional input/output (I/O) monitor 116 coupled to the audio compass 102. The optional I/O monitor 116 is operable to provide situational awareness of the source of the seismic energy to the user. For example, the optional I/O monitor 116 can comprise at least a portion of a heads-up display, a portable multi-function display, and the like.

In operation, the audio receiver 110 detects motion sensor data as seismic readings from at least two seismic sensors 108. The signal processing unit 112 converts the seismic readings received from the audio receiver 110 into audio signals. In particular, the amplitude and delays of the seismic signals received by the audio receiver 110 are converted to human stereophonic sound patterns in the signal processing unit 112 for the at least two audio outputs 104 and 106. In one embodiment, the signal processing unit 112 shifts the seismic frequency spectrum using single sideband modulation (or the like) such that all recorded seismic frequency values are shifted by a known frequency value. For example, because the frequency range of seismic activity is lower than the human ear can detect, the seismic frequency signals detected by the seismic sensors 108 are shifted to within an audible frequency bandwidth of between 20 Hz and 20 kHz in the signal processing unit 112. In addition, the audio compass 102 compensates for variations in signal intensities transmitted from each of the seismic sensors 108 based on the proximity of each of the seismic sensors 108 to the seismic energy source. For example, the signal processing unit 112 synchronizes any variations in signal intensities received from the seismic sensors 108 for estimating the distance to seismic energy sources based on sound localization, as further discussed below with respect to FIG. 2. In addition, the audio compass 102 can also estimate distances to one or more sound sources, based primarily on how reflections in the environment modify the sound (for example, reverberation within a contained space or the secured area).

Figure 2:
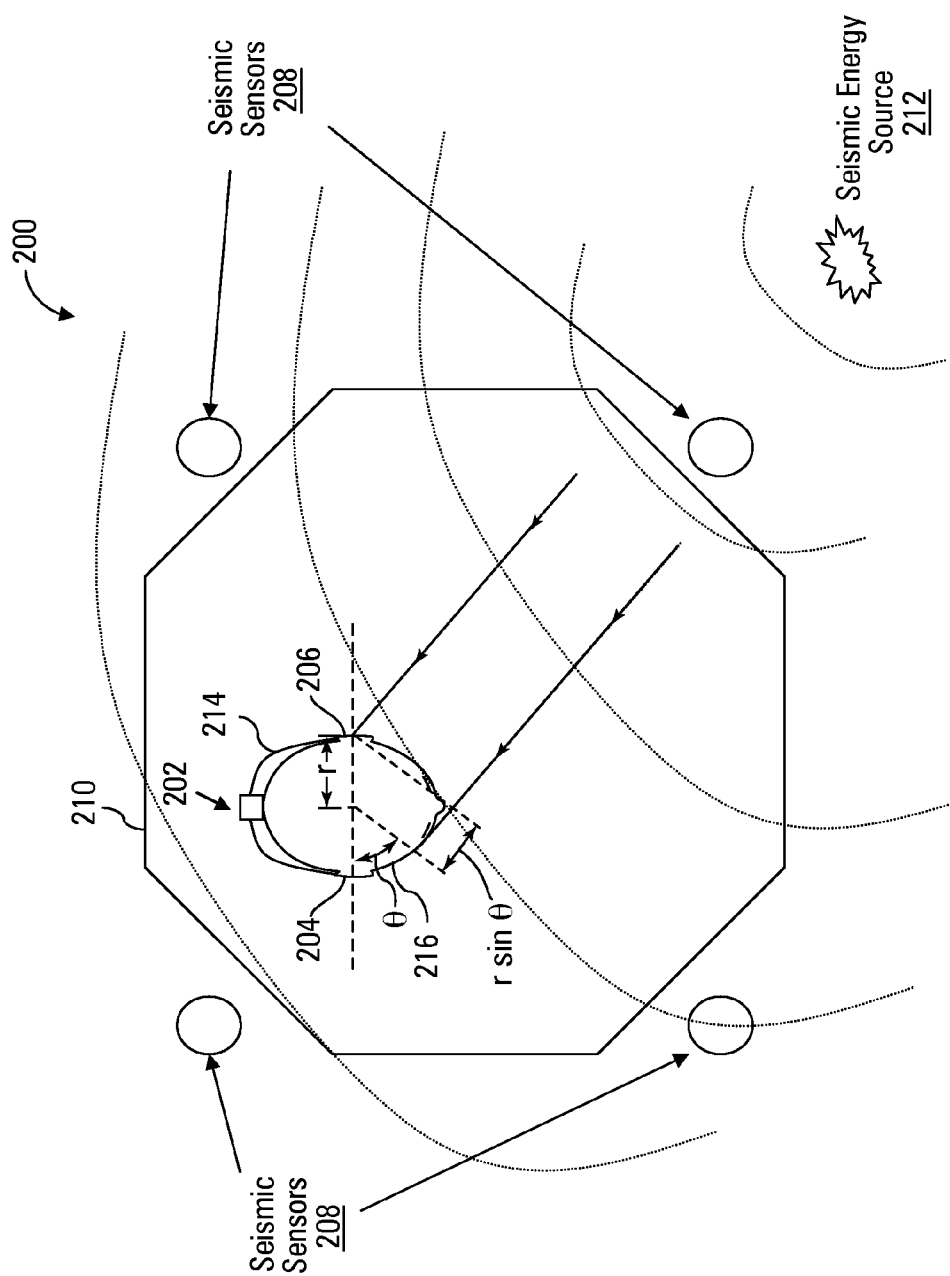
FIG. 2 is a schematic diagram illustrating a method for detecting seismic activity within a motion tracking system.

FIG. 2 is a schematic diagram illustrating a method for detecting seismic activity within a motion tracking system 200. The system 200 comprises an audio compass 202 operable to convert seismic signal transmissions from at least one seismic energy source into audio signals, similar to the audio compass 102 of FIG. 1. For example, the audio compass 202 can determine at least one of an orientation, a direction, and a distance to a seismic energy source 212. The audio compass 202 comprises a stereo headset 214 coupled to audio outputs 204 and 206.

In the example embodiment of FIG. 2, a network of seismic sensors 208 are configured for use in an area of interest for perimeter security. For example, the network of seismic sensors 208 can be buried to indicate a secured perimeter 210. It is to be understood that the seismic energy source 212 shown in FIG. 2 is representative of at least one seismic energy source inside or adjacent to the secured perimeter 210 (that is, within a measurement range of at least two of the seismic sensors 208). It is further to be understood that a plurality of seismic energy sources are detectable by the motion tracking system 200.

In operation, the seismic sensors 208 are operable to transmit any indication of motion to the audio compass 202 from the seismic energy source 212. In one embodiment, the transmissions from the seismic sensors 208 are received in the stereo headset 214 worn by a user 216. The audio compass 202 converts the seismic activity sensed by the seismic sensors 208 to stereophonic audio that is time synchronized within the audible frequency spectrum discussed above. Based on a localization of the stereophonic audio, the user 216 determines the direction of the seismic energy source 212 from the audio outputs 204 and 206 as further discussed below.

The ability to localize sound depends on interaural (that is, between the ears) intensity differences and interaural temporal or phase differences. For example, since each ear of the user 216 lie on opposite sides of the head, sound waves will reach the closest ear first, and its amplitude will be larger in that ear. Moreover, the shape of the pinna (that is, the outer ear) and of the head itself (indicated as a radius r in FIG. 2) result in a frequency-dependent variation in the amount of attenuation that each sound wave receives as it travels from the at least one seismic energy source 212 to the audio compass 202. This variation, known as a head-related transfer function (HRTF), depends not only on an azimuthal angle θ between the motion source and the user, but also on elevation. As a result, the user 216 can locate the source of the sound both in azimuth and altitude. In the example embodiment of FIG. 2, one or more HRTFs are measured at small increments of θ (for example, from about 15° to about 30° in the horizontal plane). However, even small increments of θ can lead to "front-back confusion" for the user. In this example implementation, an interpolation of r sin θ is used in the audio compass 202 to synthesize the HRTFs for arbitrary positions of θ. In addition, a gyroscope substantially eliminates the front-back confusion of the HRTF by interpretation of the direction of the seismic energy source 212 with respect to the orientation of the user 216.

Figure 3:
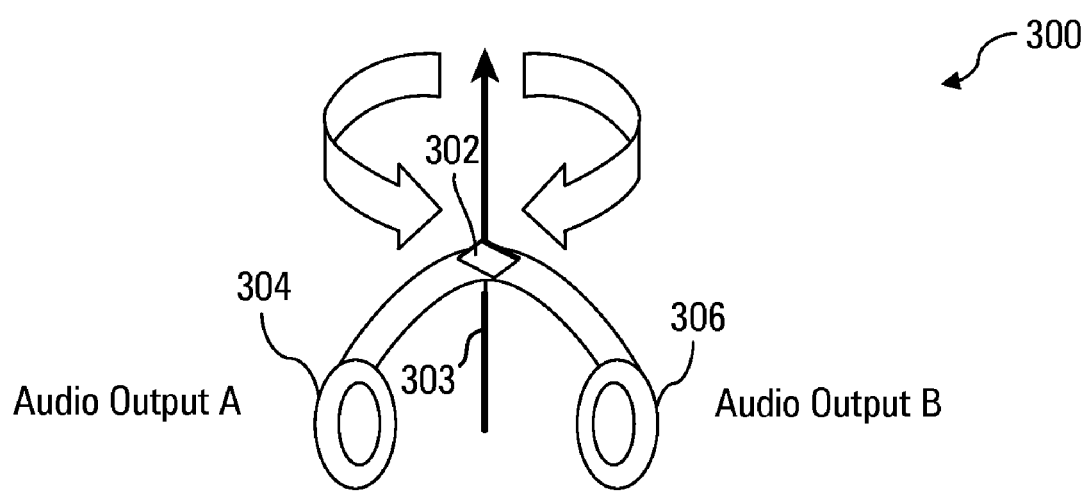
FIG. 3 is a schematic diagram of an embodiment of an audio compass.

FIG. 3 is a block diagram of an audio compass embodied in a headset 300, similar to the headset described in the motion tracking system 200 of FIG. 2. The headset 300 comprises a gyroscope 302 with a single axis of rotation 303, audio outputs 304 and 306 (Audio Outputs A and B, respectively), as well as other components similar to the audio compass 102 of FIG. 1. In one implementation, the gyroscope 303 orients the user 216 to the seismic energy source 212 of FIG. 2. The addition of the gyroscope 302 in the headset 300 allows the user 216 to maintain situational awareness of the seismic energy source 212 detected by the network of seismic sensors 208. In one implementation, the headset 300 allows the user 216 to track at least one source of seismic activity as the user 216 moves about a secured area. For example, the gyroscope 302 can orient the user 216 with the seismic energy source 212 while the audio compass 300 is in motion.

Figure 4:
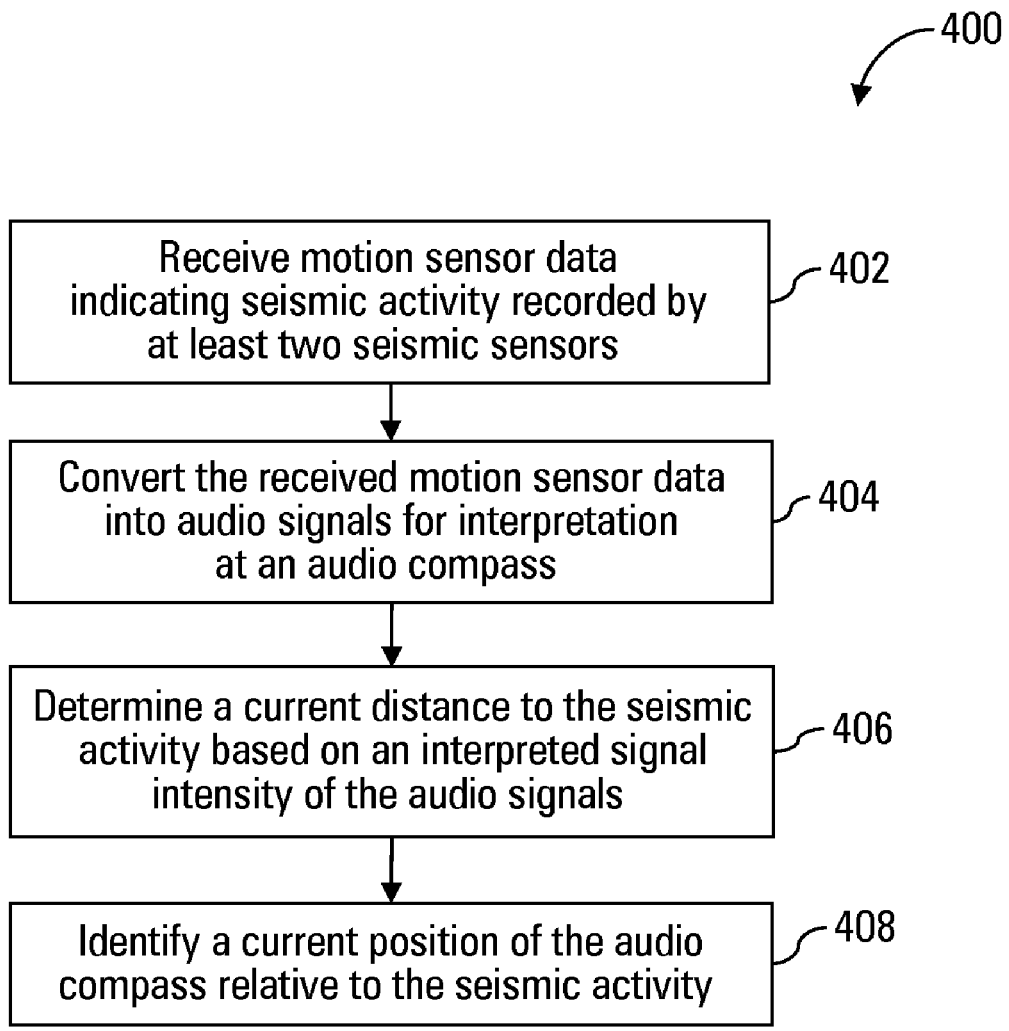
FIG. 4 is a flow diagram of a method for tracking motion using an audio compass.

FIG. 4 is a flow diagram of a method 400 for tracking motion using an audio compass. The method 400 addresses converting seismic signals to audible frequencies for further processing. For example, by locating at least one seismic energy source, a user of the audio compass is capable of adapting to a surrounding environment based on seismic signal activity. In the method 400, the audio compass receives motion sensor data indicating seismic activity recorded by at least two seismic sensors (block 402), and converts the received seismic activity data into audio signals for interpretation (block 404). In one implementation, the audio compass receives the motion sensor data indicating the seismic activity recorded by the at least two seismic sensors by detecting seismic signals within a secured perimeter defined by the at least two seismic sensors. Moreover, the audio compass converts the received seismic activity data into audio signals by shifting a seismic frequency spectrum over an audible frequency bandwidth and processes the audio signals for transmission as stereo audio signals. The audio compass determines a current distance to the seismic activity based on an interpreted signal intensity of the audio signals (block 406), and identifies a current position of the audio compass relative to the seismic activity (block 408).

In one implementation, the audio compass compensates for variations in the signal intensity transmitted from each of the sensors based on the proximity of each of the sensors to the seismic activity. The audio compass further synchronizes the signal intensity variations to estimate the distance to the seismic activity based on sound localization. Moreover, the audio compass can provide audio or visual feedback to a user of the audio compass to identify the user's current position relative to the seismic activity.

While the embodiments disclosed have been described in the context of an audio compass for motion tracking, apparatus embodying these techniques are capable of being distributed in the form of a machine-readable medium of instructions and a variety of program products that apply equally regardless of the particular type of signal bearing media actually used to carry out the distribution. Examples of machine-readable media include recordable-type media, such as a portable memory device; a hard disk drive (HDD); a random-access memory (RAM); a read-only memory (ROM); transmission-type media, such as digital and analog communications links; and wired or wireless communications links using transmission forms, such as radio frequency and light wave transmissions. The variety of program products may take the form of coded formats that are decoded for actual use in a particular audio compass or motion tracking system by a combination of digital electronic circuitry and software residing in a programmable processor (for example, a special-purpose processor or a general-purpose processor in a computer).

At least one embodiment disclosed herein can be implemented by computer-executable instructions, such as program product modules, which are executed by the programmable processor. Generally, the program product modules include routines, programs, objects, data components, data structures, and algorithms that perform particular tasks or implement particular abstract data types. The computer-executable instructions, the associated data structures, and the program product modules represent examples of executing the embodiments disclosed.

This description has been presented for purposes of illustration, and is not intended to be exhaustive or limited to the embodiments disclosed. Variations and modifications may occur, which fall within the scope of the following claims.

What is claimed is:

1. A method for tracking motion using an audio compass, the method comprising:
   receiving motion sensor data indicating seismic activity recorded by at least two seismic sensors;
   converting the received motion sensor data into audio signals for interpretation at an audio compass;
   determining a current distance to the seismic activity based on an interpreted signal intensity of the audio signals; and
   identifying a current position of the audio compass relative to the seismic activity.

2. The method of claim 1, further comprising locating the source of the seismic activity while the audio compass is in motion.

3. The method of claim 1, wherein receiving the motion sensor data indicating the seismic activity recorded by the at least two seismic sensors comprises detecting seismic signals within a secured perimeter defined by the at least two seismic sensors.

4. The method of claim 1, wherein converting the received seismic activity data into audio signals further comprises:
   shifting a seismic frequency spectrum over an audible frequency bandwidth; and
   processing the audio signals for transmission as stereo audio signals in the audio compass.

5. The method of claim 1, wherein determining the current distance to the seismic activity based on the interpreted signal intensity comprises synchronizing one or more variations in the signal intensity transmitted from each of the sensors based on the proximity of each of the sensors to the seismic activity.

6. The method of claim 1, wherein identifying the current position of the audio compass relative to the seismic activity further comprises providing audio or visual feedback to a user of the audio compass.

7. A computer-readable medium having executable instructions for a method for tracking motion using an audio compass according to claim 1.

8. An audio compass, comprising:
   an audio receiver;
   a signal processing unit responsive to the audio receiver, the signal processing unit operable to convert motion sensor data from a seismic energy source into audio signals;
   at least two audio outputs coupled to the signal processing unit; and
   a gyroscope in operative communications with the audio receiver and the signal processing unit;
   wherein the audio compass is operable to determine at least one of a current orientation, direction, and distance to the seismic energy source.

9. The audio compass of claim 8, wherein the audio compass is a personal audio headset.

10. The audio compass of claim 8, further comprising an input/output (I/O) monitor in operative communications with the signal processing unit, the I/O monitor operable to provide situational awareness of the seismic energy source to a user.

11. The audio compass of claim 8, wherein the audio receiver is operable to detect the motion sensor data as seismic readings from at least two seismic sensors.

12. The audio compass of claim 8, wherein the signal processing unit is operable to shift a seismic frequency spectrum for transmission as stereophonic audio within an audible frequency bandwidth.

13. The audio compass of claim 8, wherein the signal processing unit is further operable to synchronize variations in motion sensor signal intensities received from a plurality of seismic sensors for estimating the distance to the seismic energy source based on sound localization.

14. The audio compass of claim 8, wherein the gyroscope is operable to orient the audio compass to the seismic energy source.

15. A motion tracking system, comprising:
   at least two seismic sensors having a first arrangement;
   an audio compass in communication with the at least two seismic sensors, the audio compass operable to convert seismic readings from the at least two seismic sensors into audio signals;
   wherein the system is operable to determine a current orientation, direction, and distance to at least one seismic energy source within a measurement range of the at least two seismic sensors; and
   wherein the audio compass is operable to locate the at least one seismic energy source while the audio compass is in motion.

16. The system of claim 15, wherein each of the at least two seismic sensors comprise a piezoelectric seismic sensing node.

17. The system of claim 15, wherein the audio compass further comprises:

an audio receiver operable to detect the seismic readings from the at least two seismic sensors;

a signal processing unit responsive to the audio receiver;

at least two audio outputs coupled to the signal processing unit; and a gyroscope in operable communications with the audio receiver and the signal processing unit.

18. The system of claim 17, wherein the audio compass comprises a headset.

19. The system of claim 17, wherein the gyroscope comprises a micro electro-mechanical systems device with at least one axis of rotation.

20. The system of claim 15, further comprising an input/output (I/O) monitor coupled to the audio compass, the I/O monitor operable to provide situational awareness of the at least one seismic energy source to a user.

* * * * *